US012781436B2

(12) United States Patent
Clement et al.

(10) Patent No.: US 12,781,436 B2
(45) Date of Patent: Nov. 3, 2026

(54) BOARD, METHOD FOR MANUFACTURING A BOARD AND A PANEL COMPRISING SUCH BOARD MATERIAL

(71) Applicant: FLOORING INDUSTRIES LIMITED, SARL, Bertrange (LU)

(72) Inventors: Benjamin Clement, Waregem (BE); Jose Meirlaen, Deinze (BE); Marijn Seynaeve, Moen (BE)

(73) Assignee: UNILIN BV, Wielsbeke (BE)

( * ) Notice: Subject to any disclaimer, the term of this patent is extended or adjusted under 35 U.S.C. 154(b) by 384 days.

(21) Appl. No.: 18/529,358

(22) Filed: Dec. 5, 2023

(65) Prior Publication Data

US 2024/0102246 A1 Mar. 28, 2024

Related U.S. Application Data

(63) Continuation of application No. 17/904,328, filed as application No. PCT/IB2021/050832 on Feb. 2, 2021, now Pat. No. 12,637,810.

(Continued)

(51) Int. Cl.
*D21H 17/64* (2006.01)
*B32B 5/06* (2006.01)
(Continued)

(52) U.S. Cl.
CPC ............... *D21H 17/64* (2013.01); *B32B 5/06* (2013.01); *B32B 21/04* (2013.01); *D21H 17/57* (2013.01);
(Continued)

(58) Field of Classification Search
CPC ....... B32B 5/06; B32B 21/04; B32B 2255/02; B32B 2260/028; B32B 3/06; B32B 2471/00; D21H 17/57; D21H 17/73; D21H 27/20; D21H 17/63; D21H 27/22; D21J 1/08; D21J 1/00; E04F 13/0866; E04F 13/0894; E04F 15/02038; E04F 15/102

See application file for complete search history.

(56) References Cited

U.S. PATENT DOCUMENTS

| | | | |
|---|---|---|---|
| 4,315,967 | A | 2/1982 | Prior et al. |
| 7,947,765 | B2 | 5/2011 | Swift et al. |

(Continued)

FOREIGN PATENT DOCUMENTS

| | | | |
|---|---|---|---|
| CA | 2957138 | A1 | 2/2016 |
| CN | 106088369 | A | 11/2016 |

(Continued)

OTHER PUBLICATIONS

Wang, Guijia et al., "Effect of Ion Corrosion on 517 Phase Stability", Materials 2020, Dec. 11, 2020, pp. 1-12, vol. 13.

(Continued)

*Primary Examiner* — Amber R Orlando
*Assistant Examiner* — Anastasia A. Kuvayskaya
(74) *Attorney, Agent, or Firm* — Workman Nydegger

(57) ABSTRACT

A board including a plurality of layers having a different composition. At least one of the layers is based on MgO and MgChloride and/or at least one of said layers is based on MgO and MgSulphate. Methods for manufacturing such boards, and methods for manufacturing coated panels include such board.

20 Claims, 2 Drawing Sheets

Related U.S. Application Data

(60) Provisional application No. 63/119,417, filed on Nov. 30, 2020, provisional application No. 62/977,455, filed on Feb. 17, 2020.

(51) Int. Cl.

| | |
|---|---|
| ***B32B 21/04*** | (2006.01) |
| ***D21H 17/00*** | (2006.01) |
| ***D21H 17/57*** | (2006.01) |
| ***D21H 17/66*** | (2006.01) |
| ***D21H 17/67*** | (2006.01) |
| ***D21H 17/70*** | (2006.01) |
| ***D21H 27/20*** | (2006.01) |
| ***D21J 1/08*** | (2006.01) |

(52) U.S. Cl.

CPC ........... *D21H 17/66* (2013.01); *D21H 17/675* (2013.01); *D21H 17/73* (2013.01); *D21H 27/20* (2013.01); *D21J 1/08* (2013.01); *B32B 2255/02* (2013.01); *B32B 2260/028* (2013.01); *B32B 2307/4023* (2013.01)

(56) References Cited

U.S. PATENT DOCUMENTS

| | | | | |
|---|---|---|---|---|
| 9,611,659 | B2 | 4/2017 | Baert et al. | |
| 12,109,790 | B1 | 10/2024 | Drevet et al. | |
| 2003/0219580 | A1 | 11/2003 | Tagge et al. | |
| 2020/0047469 | A1 * | 2/2020 | Fang | E04F 15/107 |

FOREIGN PATENT DOCUMENTS

| | | | | |
|---|---|---|---|---|
| CN | 106827770 A | 6/2017 | | |
| CN | 107268945 A1 | 10/2017 | | |
| CN | 110128097 A | 8/2019 | | |
| EP | 2060389 A1 | 5/2009 | | |
| GB | 2133427 A | 7/1984 | | |
| WO | 9747834 | 12/1997 | | |
| WO | 2006066776 A2 | 6/2006 | | |
| WO | 2006108446 A1 | 10/2006 | | |
| WO | 2010070605 A2 | 6/2010 | | |
| WO | 2011077311 A2 | 6/2011 | | |
| WO | 2011141849 A2 | 11/2011 | | |
| WO | 2017172959 A1 | 10/2017 | | |
| WO | WO-2018172959 A2 * | 9/2018 | | E04C 2/043 |
| WO | 2018229649 A1 | 12/2018 | | |
| WO | 2019064113 A1 | 4/2019 | | |
| WO | 2019240838 A1 | 12/2019 | | |
| WO | 2020095196 A1 | 5/2020 | | |
| WO | WO-2020114645 A1 * | 6/2020 | | C04B 28/34 |

OTHER PUBLICATIONS

International Search Report from corresponding PCT Application No. PCT/IB2021/050832, Mar. 24, 2021.

International Search Report from corresponding PCT Application No. PCT/IB2021/051240, Apr. 29, 2021.

* cited by examiner

BOARD, METHOD FOR MANUFACTURING A BOARD AND A PANEL COMPRISING SUCH BOARD MATERIAL

BACKGROUND

The present invention relates to boards and coated panels comprising such boards, as well as to methods for manufacturing boards and coated panels comprising such boards.

In the field of decorative surfaces, such as floor panels or furniture panels several types of board materials have been in use. WO 97/47834 and WO 2010/070605 disclose the use of wood-based panels, such as MDF or HDF or wood particle board. Such panels have the disadvantage of being prone to damage due to absorption of water and lack dimensional stability in a climate with changing relative humidity.

WO 2011/077311 and WO 2011/141849 disclose plastic based boards that in some cases may comprise filler materials and/or may be foamed, such as boards comprising closed cell foamed Polyvinyl chloride (PVC). These boards are resistant to water or moisture, but sometimes lack rigidity and still lack dimensional stability when exposed to a climate with changing temperature.

WO 2006/108,446, WO 2017/172959 and WO 2019/064113 disclose mineral based boards for example based on Portland cement or magnesiumoxide (MgO), also known as Sorel cement. These boards are a lot more dimensional stable than the wood-based or plastic-based boards of the prior art. These boards are however prone to absorption of water and long term disadvantageous effects may originate as a result. Furthermore these boards are brittle and difficult to provide with a qualitative and lasting glueless coupling system. In WO 2019/064113 it is proposed to incorporate two glass fiber fabrics in the critical areas of the click system in order to prevention damage and subsequent loss of strength. Furthermore, decoration of such boards with e.g. melamine based top layers may be challenging, especially using short cycle presses in e.g. a DPL process in which one or more resin provided paper layers are cured, consolidated and adhered to a board using a heated pressing operation. The obtained delamination strength may be in sufficient.

The present invention in particular concerns new types of boards that are based on MgO and MgChloride (a board of so called MOC or magnesiumoxychloride) or that are based on MgO and MgSulphate (a board of so-called MOS or magnesiumoxysulphate).

Such boards are known per se, e.g. from the above mentioned WO 2019/064113, but may show problems of leaching of corrosive substances and/or unpleasant odors, e.g. when exposed to water. Further such boards show certain other disadvantages when being applied as decorative coated panel, such as floor panels, wall panels or ceiling panels, of which some have been elucidated above.

WO 2019/240838 discloses a board based on MgO and MgChloride with increased chemical stability due to the addition of phosphoric acid.

SUMMARY

The present invention in the first place seeks to provide alternative boards, and methods of manufacturing such boards, wherein in accordance with several preferred embodiments a solution is obtained for problems with the boards of the state of the art.

According to preferred embodiments, the invention aims at a board that can readily be used in a DPL process. Such DPL process or Direct Pressure Lamination process is a process in which one or more resin provided paper layers are cured, consolidated and adhered to a board using a heated pressing operation. Preferably, one of said resin provided paper layers is a paper layer having a print. A further one of said resin provided paper layers may be a wear layer applied on top of said print. At the side of the board opposite the print a counterbalancing layer may be applied during the same pressing operation, also including a resin-provided paper layer.

The several independent aspects of the invention, as well as certain preferred embodiments thereof are contained in the claims, and further elucidated here below.

In general, in accordance with any of the aspects of the invention defined below and in the claims, a MOC board is preferably obtained from a general composition comprising 18 to 40 wt %, or 18-26 wt % of MgO and 25 to 50 wt % or 42-46 wt % of MgCl2. A MOS board preferably shows a general composition comprising 18 to 40 wt % or 18-26 wt % of MgO and 25 to 50 wt %, or 42-46 wt % of MgSO4. The MgSO4, the MgCl2 respectively, may be added in a watery solution. In each of these mixtures 2-10 wt % of mica powder may be added. Mica powder increases the fire grading, locks water and reflects UV. As a filler 5-15 wt % of active carbon, 3 wt % of pigment and/or 0.25 wt % of sulfate may be added. The active carbon may be used to absorb formaldehyde, for example when the obtained board is used with a melamine formaldehyde containing laminate layer. The pigments are used to give the board any desired color. Further the composition may comprise 0.25 wt % of phosphate. The phosphate prevents the board from exploding during manufacturing.

In general, the MOC or MOS boards of the invention, in accordance with any of its aspects here below, may comprise any amount of plant fibers, for example wood fibers, bamboo fibers, straw fibers or any other kind of plant fibers. The amount of plant fibers contained in the board, or any layer thereof, may be as high as 90% or 95% by volume, or as high as 80 or 90% by weight.

Generally speaking, MOC or MOS in itself may have a density from 1600 to 1800 kg per cubic meter.

Generally speaking, the plant fiber may have a density from 600 to 900 kg per cubic meter.

According to a first independent aspect the present invention is a board, wherein this board is a, preferably mineral, board comprising 5Mg(OH2)·MgSO4·7H2O, or so-called 517 phase. This chemical formula denotes a possible crystal structure that is obtainable in MgO boards. The inventors have found that this crystal structure has a good resistance to dissolution in water, and therefor enhances the strength of the board, as well as diminishes the leaching of corrosive substances and/or unpleasant odors when attacked by water. The formation of this particular phase inhibits hydration of the MgO board material.

Preferably, said board is based on MgO and MgChloride, in other words a board of so called MOC or magnesiumoxychloride, or wherein the board is based on MgO and MgSulphate, in other words, a board of so-called MOS or magnesiumoxysulphate. The formation of the 517 phase can be obtained by adding citric acid to the MgO and MgChloride, or, to the MgO and MgSulphate, respectively. For example 0.1 to 10 weight parts of citric acid per 100 parts MgO may be used. For the remainder, the general composition as defined above may be used.

In MOC or MOS boards, the formation of 5Mg(OH2)·MgSO4·7H2O is preferably favoured over the formation of, in the case of MOC, the 518 phase (5Mg(OH2)

·MgCl2·8H2O) and the 318 phase (3Mg(OH2)·MgCl2·8H2O), and, in the case of MOS, the 513 phase (5Mg(OH2)·MgSO4·3H2O) and the 318 phase (3Mg(OH2)·MgSO4·8H2O). With "favoured", it is meant that the volumetric content of the favoured substance is larger than the volumetric content of the less favoured substance. It is hence preferred that the volumetric content of 5Mg(OH2)·MgSO4·7H2O is larger, preferably at least twice as large, than the volumetric content of the 518 and 318 phase together, in the case of MOC, and is larger than the volumetric content of the 513 and 318 phase together, in the case of MOS.

Preferably the volumetric content of the 518 and 318 phase together, in the case of MOC, is smaller than 10%, preferably smaller than 1%. Preferably, the volumetric content of the 513 and 318 phase together, in the case of MOS, is smaller than 10%, preferably smaller than 1%.

According to a second independent aspect, the present invention is a method for manufacturing board, comprising the steps of providing a mixture of at least MgO with one selected from the list of MgChloride and MgSulphate; and the step of adding citric acid and/or alkali resistant binders and/or separate fibers. Said alkali resistant binders are preferably chosen from the list consisting of latex, acrylic, polyurethane, polyvinyl alchohol (PVA), ethylene vinylacetate (EVA), PVAc dispersion, acrylic styrene emulsion, silicate glue (waterglass), solvent based one component or two component, e.g. polyurethane, resin, silane and siloxanes. Said separate fibers are preferably chosen from the list consisting of glass fibers, PVA fibers and cellulose fibers. Of course fibers other than the ones listed here can also be used.

It is clear that the method of the second aspect can be used to manufacture a board in accordance with the first independent aspect and/or the preferred embodiments thereof.

Preferably said mixture shows a composition in accordance with the general composition mentioned above.

As is already explained in relation to the first independent aspect, the use of citric acid promotes the formation of 5Mg(OH2)·MgSO4·7H2O.

In accordance with a variant, instead of citric acid, or in combination with citric acid, tartaric acid (C4H6O6) or phosphoric acid may be used or a chelating ligand other than the aforementioned. Preferably the total amount of citric acid, tartaric acid, phosphoric acid and/or other chelating agents or ligands in the relevant mixture, be it for forming MOS or MOC, is between 0.1 to 10 weight parts per 100 parts MgO. For the remainder, the general composition as defined above may be used.

The inventors assume that the use of citric acid, tartaric acid or other chelating ligands delays or decelerates the reactions of Mg2+ by means of the chelation mechanism and/or the formation of a more water resistant phase, in the case of MOS, the aforementioned 517 phase.

Here below four example slurry formulations are listed and the boards obtained from such slurry tested for bending strength in accordance with EN310, both in normal condition, as in a condition in which the samples had been dried after a 7 days immersion in water of 60° C. at atmospheric pressure. The results are compared with boards obtained from two reference slurries that are free from citric acid, phosphoric acid, tartaric acids, and other chelating ligands. All slurries have been cured for 16 hours at room temperature, and 48 hours at 45° C., in order to from said boards.

| Slurry 1 | wt % | Batch weight (g) |
|---|---|---|
| MgO 100% | 33.24% | 398.9 |
| MgCl2•6H2O | 33.54% | 402.5 |
| H2O | 20.79% | 249.4 |
| Total slurry | 87.56% | 1050.8 |
| H3PO4 85% | 0.20% | 2.35 |
| Slurry incl. H3PO4 | 87.76% | 1053.1 |
| Slurry with below additives | 100.00% | 1200 |
| Wood dust | 4.00% | 48.0 |
| CaCO3 | 8.00% | 96.0 |
| Antifoaming agent | 0.24% | 2.88 |

Slurry 1 thus comprises an amount of phosphoric acid of about 0.5 weight parts per 100 parts MgO.

| Slurry 2 | wt % | Batch weight (g) |
|---|---|---|
| MgO 100% | 33.19% | 398.3 |
| MgCl2•6H2O | 33.49% | 401.8 |
| H2O | 20.75% | 249.0 |
| Total slurry | 87.43% | 1049.1 |
| Citric acid 50% | 0.33% | 3.98 |
| Slurry incl. Citric acid | 87.76% | 1053.1 |
| Slurry with below additives | 100.00% | 1200 |
| Wood dust | 4.00% | 48.0 |
| CaCO3 | 8.00% | 96.0 |
| Antifoaming agent | 0.24% | 2.88 |

Slurry 2 thus comprises an amount of citric acid of about 0.5 weight parts per 100 parts MgO.

| Slurry 3 | wt % | Batch weight (g) |
|---|---|---|
| MgO 100% | 34.00% | 408.0 |
| MgCl2•6H2O | 34.30% | 411.6 |
| H2O | 21.26% | 255.1 |
| Total slurry | 89.56% | 1074.7 |
| H3PO4 85% | 0.20% | 2.40 |
| Slurry incl. H3PO4 | 89.76% | 1077.1 |
| Slurry with below additives | 100.00% | 1200 |
| Wood dust | 2.00% | 24.0 |
| CaCO3 | 8.00% | 96.0 |
| Antifoaming agent | 0.24% | 2.88 |

Slurry 3 thus comprises an amount of phosphoric acid of about 0.5 weight parts per 100 parts MgO. The difference between slurry 3 and slurry 1 is in the proportion of wood dust

| Slurry 4 | wt % | Batch weight (g) |
|---|---|---|
| MgO 100% | 33.95% | 407.3 |
| MgC12•6H2O | 34.25% | 411.0 |
| H2O | 21.23% | 254.7 |
| Total slurry | 89.42% | 1073.0 |
| Citric acid 50% | 0.34% | 4.07 |
| Slurry incl. Citric acid | 89.76% | 1077.1 |
| Slurry with below additives | 100.00% | 1200 |
| Wood dust | 2.00% | 24.0 |
| CaCO3 | 8.00% | 96.0 |
| Antifoaming agent | 0.24% | 2.88 |

Slurry 4 thus comprises an amount of citric acid of about 0.5 weight parts per 100 parts MgO. The difference between slurry 4 and slurry 2 is in the proportion of wood dust.

| Reference Slurry 1 | wt % | Batch weight (g) |
|---|---|---|
| MgO 100% | 34.45% | 413.5 |
| MgCl2•6H2O | 34.76% | 417.1 |
| H2O | 21.45% | 258.5 |
| Total slurry | 90.76% | 1089.1 |
| Slurry with below additives | 100.00% | 1200 |
| Wood dust | 1.00% | 12.0 |
| CaCO3 | 8.00% | 96.0 |
| Antifoaming agent | 0.24% | 2.88 |

| Reference Slurry 2 | wt % | Batch weight (g) |
|---|---|---|
| MgO 100% | 34.64% | 415.7 |
| MgCl2•6H2O | 34.95% | 419.4 |
| H2O | 21.66% | 259.9569 |
| Total slurry | 91.26% | 1095.12 |
| Slurry with below additives | 100.00% | 1200 |
| Wood dust | 0.50% | 6 |
| CaCO3 | 8.00% | 96.0 |
| Antifoaming agent | 0.24% | 2.88 |

The obtained results were as follows:

| Board obtained from | EN 310 normal conditions | EN 310 after immersion |
|---|---|---|
| Slurry 1 | 9.1 MPa | 2.95 MPa |
| Slurry 2 | 18.6 MPa | 5.9 MPa |
| Slurry 3 | 17.0 MPa | 2.9 MPa |
| Slurry 4 | 21.8 MPa | 4.55 MPa |
| Reference slurry 1 | 20.1 MPa | Not definable |
| Reference slurry 2 | 24.1 MPa | Not definable |

The bending strength in accordance with EN 310 could not be defined for the board obtained from the reference slurry after a 7 days immersion in water, because this board had completely lost structural integrity.

From the above results, it can be concluded that, under normal conditions, wood dust tends to lower the bending strength, while this effect is hardly noticeable or even opposite after immersion. It can further be concluded that the use of chelating ligands, like citric acid and phosphoric acid, may slightly lower the bending strength as measured under normal conditions, but does lead the board to maintain its structural integrity after immersion in water. Herein, the use of citric acid leads to significantly better results compared to phosphoric acid. With low to moderate wood content the binding strength of a citric acid containing board (see e.g. slurry 4) may even be higher than that of a reference slurry having similar wood content.

The use of the alkali resistant binders, in accordance with the second independent aspect, in the MgO slurry or mixture replaces part of the watery content and may increase the flexibility of the obtained board. An increased flexibility is interesting in many applications for example in the case where such board is provided with mechanical coupling means formed in one piece or substantially in one piece with the board material. Silanes and siloxanes in particular may improve internal bonding and increase the hydrophobicity of the obtained board.

The use of separate fibers, for example chopped glass fibers or PVA or cellulose fibers, may as well increase the flexibility of the obtained board. In such case, the board may be free of glass fiber fabrics, be it woven or non-woven. Preferably the fibers have a sizing or resin treatment, for example with silane, such as amino silane, to improve adhesion of the fibers with the MgO matrix of the board.

According to a third independent aspect, the present invention is a board, wherein this board is a, preferably mineral, board comprising MOC or MOS and having a residual moisture content of 7% or below, preferably 5% or below, or even more preferably 4% or below.

A low residual moisture is of interest when such board is intended to be further treated in a hot press, for example with the purpose of adhering a laminate layer in a so-called DPL process (Direct Pressure Lamination). In such process one or more resin provided paper layers, including a printed paper layer, are cured, consolidated and adhered to the board in a heated press. The resin is preferably thermosetting, for example a melamine formaldehyde resin. The temperature of the press may be 120 to 200° C. Excessive water damp formation in the press may lead to scrap production due to board explosions upon opening of the press. A low residual moisture content of the board reduces this risk.

According to a fourth independent aspect, the present invention is a method for manufacturing a board, comprising at least the following steps:

- the step of providing a mixture of at least MgO with one selected from the list of MgChloride and MgSulphate;
- the step of converting the mixture into a board;
- the step of drying said board to a residual humidity of 7% or below and/or the step of impregnating said board with a binder and/or the step of applying a coating with a binder to said board.

Said binder may be latex, acrylic, polyurethane, polyvinylalchohol (PVA), ethylene vinylacetate (EVA), PVAc dispersion, acylic styrene emulsion, silicate glue, solvent based one component or two component resin, silane or siloxanes.

Clearly, the method of the fourth aspect may lead to a board in accordance with the third aspect of the invention.

The drying step of said fourth aspect is in addition to the normal curing of the mixture into said board. Preferably, the drying step is performed at a temperature between 50 and 150° C., for example 2 hours at 120° C., followed by 4 hours at 95° C., and followed by 12 hours at 60° C.

The application of a binder by impregnation or coating may lead to an enhanced flexibility and/or tensile strength of the board. Preferably, said binder is applied before further DPL processing.

Preferably, the application of said binder is performed by means of vacuum impregnation or by means of any other coating application for example on the raw board surface. For example spraying techniques, roller coating techniques or curtain coating may be applied.

Preferably, prior to said step of drying, a polymer, for example said binder, is applied to one or more surfaces of said board. The application can be performed with any coating or impregnation technique, for example by means of a spraying technique.

According to a fifth independent aspect, the invention is a board, wherein this board comprises a plurality of layers having a different composition, wherein at least one of said layers is based on MgO and MgChloride, in other words a layer of so called MOC or magnesiumoxychloride, and/or wherein at least one of said layers is based on MgO and MgSulphate, in other words a layer of so-called MOS or magnesiumoxysulphate. Such a board allows to adapt the composition of each respective layer to its required functionality. The functionality may relate to an increased flexibility, an increased adherence with a top layer, such as a DPL or melamine top layer, or an increased dimensional stability.

Preferably, said board comprises at least three layers, wherein the centrally located layer has a different composition compared to at least one of the more outwardly located layers. Preferably said three layers are based on MgO and MgChloride (layers of so called MOC or magnesiumoxychloride) and/or on MgO and MgSulphate (layers of so-called MOS or magnesiumoxysulphate). Said difference in composition may be expressed as a difference in density, a difference in cellulose content or a difference in ash/cellulose.

Preferably, the board comprises basically three or five layers, with the outwardly located layers having a same, or substantially a same, common composition. In this way a symmetric build-up is obtained that has a minimized risk of warping.

Preferably, one or at least one of said layers comprises a content of 15% by weight or more cellulose based material, e.g. up to 90 wt %, preferably 15-30 wt % or 20-30 wt %, while another one of said layers comprises less cellulose based material, preferably a content of less than 15% by weight. Said cellulose based material may be chosen from the list consisting of wood dust, wood fibers, wood particles, bamboo particles, straw particles and paper fibers. Preferably the centrally located layer of a three or five layer board is the layer with the lower cellulose content. The availability of the higher cellulose content, preferably 15 wt % or more, at the outer layers promotes adhesion with e.g. a melamine based top layer, while the lower cellulose content in the centrally located layer maximally maintains dimensional stability of the board with changes in ambient relative humidity. The higher cellulose content at the outer layers may accommodate deformations due to the forming of a relief or structure on the top side of a coated panel panel comprising such board. For example, structure features having a depth of 0.2 millimeter or more, or even of 0.35 millimeter or more may be achieved, in particular in coated panels where a DPL laminate layer is formed on the board. Such structure feature may relate to the imitation of wood cracks or nuts. In a preferred embodiment, such structure feature forms a lower edge area at one or more of the edges of the coated panel, for example a lower edge area forming a bevel or a groutline imitation.

Although a decorative top layer comprising melamine based resin is preferred. It is not excluded that other types of decorative top layers are used, such as a layer of stone or wood veneer, preferably thinner than 1 mm, a layer of heterogeneous PVC having a printed pattern, a ceramic tile, a wood facer, preferably of at least 2.5 mm thickness, a decorative layer comprising a printed pattern performed on the board with the intermediate of preparatory layers, for example by means of digital inkjet printing or analog roller printing. Also in these cases, the adherence or delamination resistance is positively influenced by means of the cellulose content in the board, for example in the top outer layer of a three or five layer board. Preferably the material of the decorative layer, for example the melamine formaldehyde resin or the glue used to adhere one of the other types of decorative top layers, penetrates the board for at least 0.1 mm. In such case a mechanical anchoring of the decorative top layer can be achieved.

Preferably, at least one or one of said layers comprises a weight ratio ash/cellulose content from 1/1 to 4/1, while another one of said layers comprises a weight ratio ash/cellulose content that is higher, preferably 2/1 to 6/1. Said cellulose based material may be chosen from the list consisting of wood dust, wood fibers, wood particles, bamboo particles, straw particles and paper fibers. Preferably, the centrally located layer of a three or five layer board is the layer with the higher weight ratio ash/cellulose content.

Preferably, said board comprises at least 5 layers.

Preferably, said board is symmetric through its thickness, i.e. the layers at both sides of a centrally located layer show a thickness, composition and order that results in a symmetric build-up as seen from the middle of the thickness of the board.

According to a first practical embodiment, said board essentially comprises three layers, namely a centrally located layer with 0 to 10 wt %, preferably 0-6 wt %, of cellulose based material, and two outer layers, one at each side of said centrally located layer, wherein said outer layers each have a higher cellulose content than said centrally located layer, preferably a cellulose content of 15 wt % or higher, e.g. of 15 to 30 wt %, or of 20-30 wt %. According to a second practical embodiment, said board essentially comprises three layers, namely a centrally located layer with an ash/cellulose weight ratio of 6/1 to 18/1, and two outer layers, one at each side of said centrally located layer, wherein said outer layers each have a lower ash/cellulose weight ratio, preferably of 1/1 to 4/1.

According to a third practical embodiment, said board essentially comprises five layers, namely a centrally located layer with 0 to 10 wt %, preferably 0-6 wt %, of cellulose based material, two outer layers, one at each side of said centrally located layer, and two intermediate layers, one intermediate to each of the outer layers and the centrally located layer, wherein said outer layers each have a higher cellulose content than said centrally located layer, preferably a cellulose content of 15 wt % or more, e.g. of 15 to 30 wt %, or of 20-30 wt %, and wherein said intermediate layers have an intermediate cellulose content, preferably of 5 to 15 wt %. According to a fourth practical embodiment, said board essentially comprises five layers, namely a centrally located layer with an ash/cellulose weight ratio of 6/1 to 18/1, two outer layers, one at each side of said centrally located layer, and two intermediate layers, one intermediate to each of the outer layers and the centrally located layer, wherein said outer layers each have a lower ash/cellulose weight ratio, preferably of 1/1 to 4/1, and wherein said intermediate layers have an intermediate cellulose content, preferably with an ash/cellulose weight ratio of 2/1 to 6/1.

In the case of a board for use as a gluelessly connectable panel, preferably one or more of the critical areas of the coupling parts, for example these portions of the coupling parts that are required to resiliently deform upon coupling, are at least partially provided in the layers of the board that comprise the highest cellulose content. Thus, in the case of a three layer board in accordance with the first or second practical embodiment, in the outer layers, and, in the case of a five layer board in accordance with the third and fourth practical embodiment, in the outer layers and/or the intermediate layers. Preferably, said critical areas comprise the lower groove lip of a tongue and groove connection. Preferably, in such case, at least half of the thickness of the lower lip at its thinnest zone is formed by the lower outer layer and/or lower intermediate layer.

According to another example, such critical areas of the coupling parts may comprise contact surfaces formed between coupling parts of two such panels, in a coupled condition. For example, at least the contact between a tongue and the bottom of the upper lip of the groove may be at least partially, and preferably entirely realized, in the case of a three layer board in accordance with the first or second practical embodiment, in one of the outer layers, and, in the case of a five layer board in accordance with the third and fourth practical embodiment, in one of the outer layers and/or the intermediate layers adjacent to the relevant outer layer. According to still another example, at least the contact between the locking elements responsible for preventing the drifting apart of a lockable tongue-and-groove connection may be at least partially, and preferably entirely realized, in the case of a three layer board in accordance with the first or second practical embodiment, in one of the outer layers, and, in the case of a five layer board in accordance with the third and fourth practical embodiment, in one of the outer layers and/or the intermediate layers adjacent to the relevant outer layer.

The higher cellulose content in the outer and intermediate layer may give raise to a smoother, potentially more accurately performed, surface upon milling or otherwise providing said coupling parts. The provision of one or more of said contact surfaces in a layer of higher cellulose content may hence lead to a more accurate coupling, ie. with no or minor height differences, and/or free from play, or practically free from play.

It is clear that several of the above examples of critical areas being at least partially provided in a layer with higher cellulose content may be combined in one and the same coupling system.

Preferably, said layers have a different composition resulting in a different color, preferably a different color as expressed by a difference in Luminance value and/or Saturation value of at least 10. Herein layers having a same cellulose content may have a same or similar color. Preferably, in a three or five layer board, at least the centrally located layer has a color different from the color of one or both outer layers.

Preferably, said layers of the board of said fifth independent aspect have a different composition resulting in a different density, e.g. a density difference of at least 100 $kg/m^3$, and preferably at least 150 $kg/m^3$, or of at least 10%, and preferably at least 15% of the densest layer.

According to a sixth independent aspect, the invention is a method for manufacturing a coated panel, wherein a board in accordance with any of the preceding aspects is provided with a decorative layer, preferably by means of a press operation wherein a melamine treated paper sheet is heat pressed to said board. The invention of the sixth aspect may comprise a DPL operation wherein one or more resin-provided paper layers are cured, consolidated and adhered to said board, in one and the same pressing operation. Preferably said resin-provided paper layers at least comprise a paper layer having a print, and potentially an overlying transparent paper layer, or so-called overlay. The resin is preferably thermosetting and/or a melamine based resin, such as melamine formaldehyde resin. In the same pressing operation a structure may be embossed on the surface of the pressed stack by means of a structured press element, for example by pressing the protrusions of said press element into at least the resin situated above said print.

According to a seventh aspect, the present invention is a method for manufacturing a coated panel, whether or not in accordance with said sixth independent aspect, said panel comprising a board and a decorative layer provided thereon, wherein the board is based on MgO and MgChloride, in other words a board of so called MOC or magnesiumoxychloride, or wherein the board is based on MgO and MgSulphate, in other words a board of so-called MOS or magnesiumoxysulphate, said method further being with the characteristic that

- said board comprises metal soap, silanes, siloxanes and/or siliconates or a combination of both. The availability of one or more said substance internally in the board increase the hydrophobicity of the board; and/or
- said board comprises at least one and preferably at both flat sides a chloride and/or sulphate leaching barrier, such as an aluminum foil, a coating with a thermoplastic material. Such barrier aids in prevention the leaching of corrosive or bad smelling substances. Preferably, in the case of a board used in a DPL process, said barrier is applied prior to the pressing operation; and/or
- said board at at least one edge, and preferably at least at two opposite edges, or at all edges, is treated with a sealant, e.g. an alkali resistant sealant; preferably the treated edges are profiled and comprise coupling means or coupling parts allowing to couple two such boards at the respective edges, wherein a vertical locking perpendicular to the plane of coupled panels and/or a horizontal locking perpendicular to the respective edges and in the plane of the coupled panels is obtained. Said alkali resistant sealant may be chosen from the list consisting of paraffin, latex, acrylic, polyurethane, polyvinylalchohol (PVA), ethylene vinylacetate (EVA), PVAc dispersion, acrylic styrene emulsion, silicate glue, solvent based one component or two component, preferably polyurethane resin, silane or siloxanes.

According to an eighth independent aspect, the present invention is a method of manufacturing a coated panel, whether or not in accordance with said sixth and/or seventh independent aspect, said panel comprising a board and a decorative layer provided thereon, wherein the board is based on MgO and MgChloride, in other words a board of so called MOC or magnesiumoxychloride, or wherein the board is based on MgO and MgSulphate, in other words a board of so-called MOS or magnesiumoxysulphate, said method further having the characteristic that said decorative layer comprises:

- a printed paper sheet (decor) being treated with a resin, such as melamine formaldehyde (MF), polyurethane (PU), latex, acrylate dispersion or a combination thereof. Preferably such treated paper
- has a raw paper weight of 50 to 100 grams per square meter; and/or.
- has a resin content of 50 to 130 grams per square meter dry weight; preferably 50 to 100 grams per square meter, when an underlay is used as below, and 80 to 130 grams per square meter, when no underlay is used as below and the printed paper sheet is pressed directly on top of the board;
- and/or
- comprises, in particular when such treated paper sheet is intended to form the final upper surface of the panel (i.e. without the overlay paper as below), preferably particles of aluminumoxide e.g. in an amount of 0.1-40 grams per square meter.
- and/or
- a paper sheet (overlay), preferably unfilled, that is transparent or translucent in the obtained panel and applied on top of said printed paper sheet. Preferably said paper sheet is being treated with resin, such as melamine formaldehyde (MF), polyurethane (PU), latex, acrylate dispersion or a combination thereof. Preferably such treated paper has a raw paper weight of 8 to 30 or 15 to 35 grams per square meter; and/or.

has a resin content of 30 to 150 grams per square meter dry weight; preferably 30 to 100 grams per square meter; and/or comprises, preferably particles of aluminum oxide e.g. in an amount of 0.1-40 grams per square meter.

and/or a paper sheet (underlay) applied below the printed paper sheet. Preferably said paper sheet is being treated with resin, such as melamine formaldehyde (MF), polyurethane (PU), latex, acrylate dispersion or a combination thereof. Preferably such treated paper has a raw paper weight of 8 to 30 or 15 to 35 grams per square meter; and/or.

has a resin content of 20 to 80 grams per square meter dry weight.

Preferably, said particles of aluminum oxide are positioned at the bottom of said overlay, i.e. at the side of the overlay paper sheet facing the printed paper sheet. At the side facing away from said printed paper sheet particles of aluminum oxide may be present as well, preferably having a smaller average particle size. The particles at the bottom side may have an average particle size between 60 and 120 micrometer, while the particles at the top side may have a smaller average particle size, for example smaller than 45 micrometer.

Preferably, said decorative layer is applied to the board by means of a heated press treatment wherein a stack comprising said board, and at least said printed paper sheet treated with resin, and potentially an overlay as defined in said eighth independent aspect and/or an underlay as defined in said eighth independent aspect, and/or a counterbalancing layer at the bottom of the board, is brought into a heated press equipment and pressed at a pressure of at least 20 bars, and a temperature of at least 120° C. during at least 10 seconds, wherein a consolidation of the stack is attained together with a curing of the available resin. In other words a DPL technique is used. According to a preferred embodiment, the stack is pressed for 20 seconds at 50 kg/cm$^2$ and at 195° C.

The eighth independent aspects leads to a good delamination resistance. The MOC or MOS board is usually porous and absorbs water as well as resin. The above eighth aspects ensures sufficient resin to enable a resin flow towards and into said board. In so doing, a sufficient adhesion of the decorative layer to the board may be reached.

Preferably, the resin applied to any of the respective paper sheets mentioned in the eighth independent aspect is a melamine formaldehyde resin. Preferably, the melamine formaldehyde resin is tuned to decrease polycondensation water. This can be obtained by using a melamine to formaldehyde ratio of 1:1.5 or higher (i.e. with less formaldehyde) and/or by curing one or more of the melamine formaldehyde (MF) treated papers prior to the pressing to a degree of crosslinking above 30%, preferably above 50%. The degree of cross-linking is the quantity of impregnated resin which cannot be dissolved from the sample after dipping for 35 minutes in DMF (dimethyl formamide) at room temperature.

In case the resin applied to one or more of the paper sheets mentioned in the eighth aspect is polyurethane (PU), latex, an acrylate dispersion or a combination thereof, or a combination of any of these with melamine formaldehyde, polymer shrinkage in the press can be diminished, such that smaller pulling forces in the decorative layer, tending to wrap the pressed whole, are obtained. In this case also less polycondensation moisture is achieved.

According to a ninth independent aspect, the invention is a floor, wall, ceiling or furniture panel comprising a board in accordance with, or obtained through any of the preceding independent aspects and a provided thereon decorative top layer.

Preferably, the panel of the ninth aspect is at at least two opposite edges provided with coupling means or coupling parts allowing to couple two such panels at the respective edges, wherein a vertical locking perpendicular to the plane of coupled panels and/or a horizontal locking perpendicular to the respective edges and in the plane of the coupled panels is obtained. Preferably, said coupling means are basically shaped as a tongue and a groove, wherein the groove is bordered by an upper and a lower lip. Preferably, said lower lip and/or said upper lip comprises a locking element taking part in said horizontal locking, wherein the respective lip is at least partially provided in a layer of the board that comprises cellulose fibers. Preferably, said board comprises at least three layers, namely a centrally located layer and two more outwardly situated layers at each side of the central layer, wherein the more outwardly situated layers comprise a higher cellulose content than the central layer—that may, in accordance with a particular embodiment, comprise no cellulose at all—, and wherein the respective lip is provided at least partially, and potentially essentially or wholly in the outwardly situated layer situated at the bottom of said central layer.

Preferably, said coupling means further show characteristics as disclosed in the above mentioned WO 97/47834.

Preferably, said coupling parts are provided at least at the edges of two opposite sides of a panel, wherein said coupling parts cooperate which each other and are substantially in the form of a tongue and a groove, wherein said coupling parts are provided with integrated mechanical locking means which prevent the drifting apart of two coupled floor panels into a direction perpendicular to the related edges and parallel to the underside of the coupled panels, e.g. floor panels. Preferably, the coupling parts are provided with means, which are formed more particularly by the aforementioned locking means, which, in the engaged condition of two or more of such panels exert a tension force upon each other which forces the panels towards each other. Preferably, at least one of the coupling parts has an elastically bendable portion which, in the engaged condition, is at least partially bent and in this manner provides the aforementioned tension force. Preferably, the elastically bendable portion consists of a lip, preferably the lip limiting the lower side of the aforementioned groove. Said bendable portion may be provided with a contact surface which inwardly slopes downward.

Preferably, the coupling parts and the locking means are realized in one piece with the core of the panels, e.g. floor panels.

Preferably, the panels show the following combination of characteristics: that the coupling parts and locking means are realized in one piece with the core of the panels, e.g. floor panels; that the coupling parts have such a shape that two subsequent floor panels can be engaged into each other exclusively by snapping together and/or turning, whereby each subsequent floor panel can be inserted laterally into the previous; that the coupling parts provide in an interlocking, free from play, according to all directions in the plane which is situated perpendicular to the aforementioned edges; that the possible difference between the upper and lower lip of the lips which border the aforementioned groove, measured in the plane of the panel and perpendicular to the longitudinal direction of the groove, is smaller than one time the total thickness of the panel; that the total thickness of each related panel is larger than or equal to 5 mm; and that the basic material of the panels, of which the aforementioned core and the locking means are formed, consists of a board that is based on MgO and MgChloride, in other words a board of so called MOC or magnesiumoxychloride, or, consists of a board that is based on MgO and MgSulphate, in other words a board of so-called MOS or magnesiumoxysulphate.

Generally, it is noted that the inventors found that a cellulose content in a board may be beneficial for adherence of coating layers, such as decoration layers, in particular so-called DPL, wherein a melamine treated paper layer is attached to the board, but when the cellulose content is overall too high, it may lead to a diminished dimensional stability of the board as a whole. Further the inventors have found that uptake of water in the board may lead to degradation of the MgO material. The inventors have also found that the bound between MgO and a glass fiber net may be weak. The boards of the invention, in accordance with any of its independent aspects, are preferably free from glass fiber nets or unwoven structures. Instead the present invention proposes, amongst others, to include separate fibers and/or to coat the fibers with a coupling agent or resin.

The invention, in accordance with a particular independent aspect, is an MgO board comprising active carbon. This may be a MOC or MOS board. The active carbon may be used to absorb formaldehyde, for example when the obtained board is used with a melamine formaldehyde containing laminate layer.

The invention, in accordance with a second particular independent aspect, is an MgO board comprising wood fibers and/or other plant fibers, preferably in a ratio of more than 50% by volume. Preferably the plant fiber content is between 65 and 95% by volume.

It is clear that a board in accordance with any or both of the present particular independent aspects may further show the features of any of the aforementioned aspects and/or the preferred embodiments thereof.

It is further remarked that any particle sizes and average particle sizes recited above are preferably defined by means of laser light scattering granulometry accordance with ISO 13320, namely by a dynamic light scattering technique using a laser having an emission wavelength of 632.8 nm and measured under a scattering angle of 90 degrees. Such granulometry may e.g. be performed with a Malvern® Mastersizer 2000 or with a Malvern® Mastersizer 3000. For executing the measurement of the particle size distribution, the respective particles may be dispersed in a liquid, such as water.

BRIEF DESCRIPTION OF THE DRAWINGS

With the intention of better showing the characteristics according to the invention, in the following, as an example without limitative character, an embodiment is described, with reference to the accompanying drawings, wherein.

DETAILED DESCRIPTION OF VARIOUS EMBODIMENTS

Figure 1:
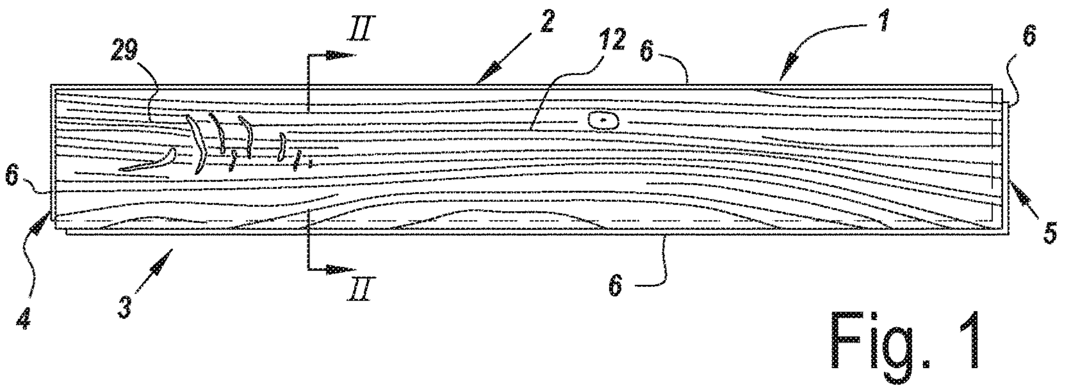
FIG. 1, in perspective, shows a floor panel in accordance with the invention.

FIG. 1 illustrates a panel 1 in accordance with the ninth aspect of the invention. In this case it is a floor panel 1 that is oblong and rectangular and comprises a long pair of opposite edges 2-3 and a short pair of opposite edges 4-5, both provided with coupling parts 6 allowing to couple two such panels at the respective edges 2-3;4-5.

Figure 2:
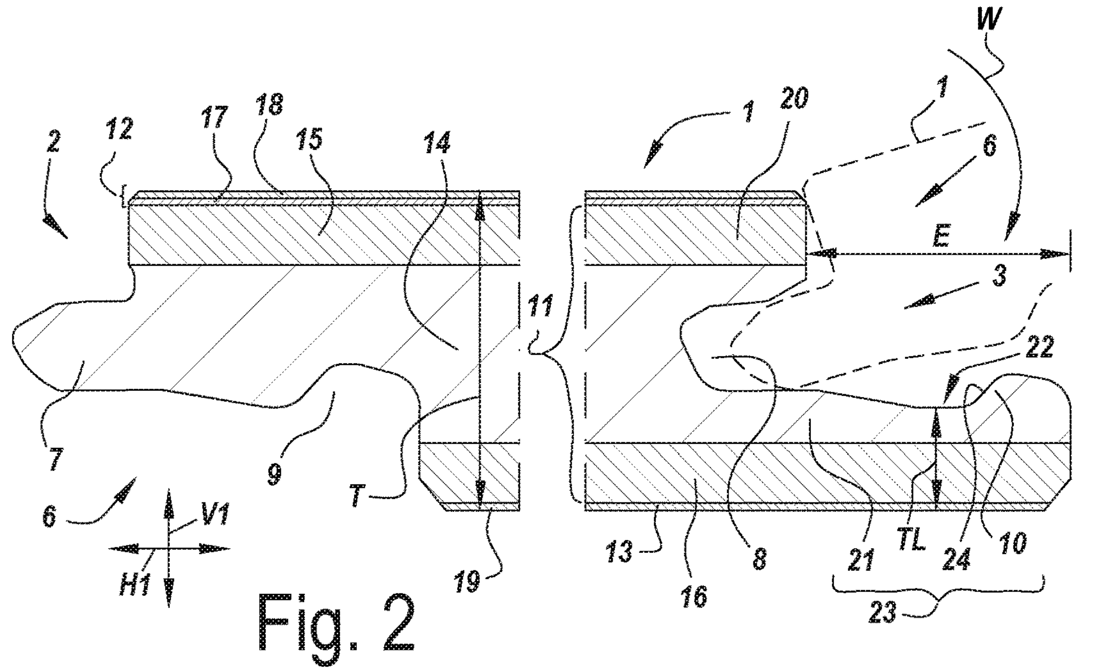
FIG. 2 at larger scale shows a cross-section according to the line II-II on FIG. 1.

FIG. 2 shows that the coupling parts 6 at least on the long pair of opposite edges 2-3 are basically shaped as a tongue 7 and a groove 8 provided with locking elements 9-10 preventing the moving apart of the tongue and groove connection. These coupling parts 6 are realized in one piece with the core or board 11 of the floor panels 1. The cooperation of the coupling parts 6 results in two such panels 1 to become interlocked, wherein a vertical locking in a direction V1 perpendicular to the plane of coupled panels 1 and a horizontal locking in a direction H1 perpendicular to the respective edges 2-3 and in the plane of the coupled panels 1 is obtained.

FIG. 2 further shows that the floor panel 1 comprises a board 11 and a provided thereon decorative layer 12. At the bottom of the board 11 a counterbalancing layer 13 is provided.

The board 11 is based on MgO and MgChloride, or, based on MgO and MgSulphate. In this case the board 11 in particular shows the characteristics of the fifth independent aspect. The board comprises a plurality of layers 14-15-16 having a different composition. In the example, the board 11 comprises at least three layers, namely a centrally located layer 14 and two more outwardly situated layers 15-16 at each side of the central layer 14, wherein the more outwardly situated layers 15-16 each comprise a higher cellulose content than the central layer 14. The cellulose content of the outer layers 15-16 may be 15 wt % or higher, while the cellulose content of the centrally located layer 14 is between 0 and 6 wt %.

The floor panel 1 in the example of FIGS. 1 and 2 further illustrates a coated panel obtained or obtainable through a method with the characteristics of the eighth independent aspect of the invention. The decorative layer 12 comprises a printed paper sheet 17 being treated with a melamine formaldehyde resin, wherein the paper sheet 17 has a raw paper weight of 50 to 100 grams per square meter and has a resin content of 50 to 130 grams per square meter dry weight. The decorative layer 12 further comprises an overlay, in this case a paper sheet 18 that is transparent or translucent in the obtained panel and applied on top of said printed paper sheet 17. Said overlay is treated with melamine formaldehyde resin as well, has a raw paper weight of 8 to 30 grams per square meter and a resin content of 30 to 100 grams per square meter. The overlay comprises, at its side facing said printed paper sheet 17, particles of aluminum oxide in an amount of 8-20 grams per square meter. Said counterbalancing layer 13 also comprises a paper sheet 19 and melamine formaldehyde resin, for example a paper sheet 19 having a raw paper weight of 70 to 100 grams per square meter and a resin content of 80 to 200 grams per square meter dry weight.

The higher cellulose content in the upper outer layer 15 is beneficial for creating a sufficient adherence with the melamine formaldehyde resin containing top decorative layer 12. The lower cellulose content in the centrally located layer 14 ensures an acceptable dimensional stability of the coated panel 1 as a whole in changing ambient relative humidity.

It is noted that, in the example of FIG. 2, the groove 8 at said long pair of opposite edges 2-3 is bordered by an upper lip 20 and a lower lip 21, and, in this case, it is the lower lip 21 that comprises a locking element 10 taking part in said horizontal locking. The lower lip 21 is provided at least partially in the outer layer 16 situated at the bottom of said central layer 14, namely in a layer of the board that comprises cellulose fibers. Preferably, as is the case here, at least half of the thickness TL of the lower lip 21 at its thinnest zone 22 is formed by said lower outer layer 16.

In the example tongue-and-groove locking system, the lower lip 21 of the groove 8 is required to or resiliently deform upon coupling. The lower lip 21 can therefore be regarded as a critical area of the coupling system. Because of it being at least partially provided in the cellulose containing lower outer layer 16 of the board 11, the risk of failure of the lower lip 21 upon coupling and afterwards can be limited.

In the engaged condition of two or more of such panels 1 the locking elements 9-10 exert a tension force upon each other which forces the panels 1 towards each other. In the example the lower lip 21 of the groove 8 has an elastically bendable portion 23 which, in the engaged condition, is at least partially bent and in this manner provides the aforementioned tension force. Said bendable portion 23 is provided with a contact surface 24 which inwardly slopes downward.

Preferably, the coupling parts 6 and the locking means 9-10 are realized in one piece with the core or board 11 of the panels 1, e.g. floor panels.

The floor panels 1 illustrated in FIG. 2 further show the characteristics that the coupling parts 6 have such a shape that two subsequent floor panels can at least be engaged into each other by a turning movement W, whereby each subsequent floor panel 1 can be inserted laterally into the previous; that the coupling parts 6 provide in an interlocking, free from play, according to all directions in the plane which is situated perpendicular to the aforementioned edges 2-3; that the possible difference E between the upper lip 20 and lower lip 21 of the groove 8, measured in the plane of the panel and perpendicular to the longitudinal direction of the groove 8, is smaller than one time the total thickness T of the panel 1; that the total thickness T of each related panel 1 is larger than or equal to 5 mm, or even larger than or equal to 7 mm.

Figure 3:
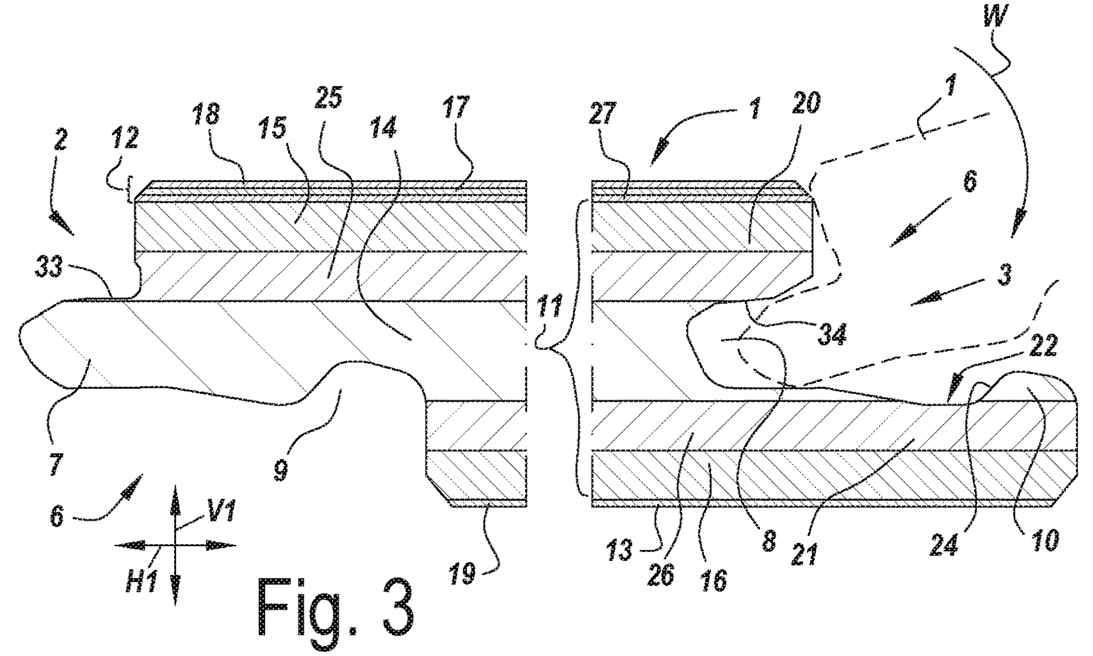
FIG. 3 in a similar view shows a variant.

FIG. 3 shows a similar example floor panel 1 as that illustrated by means of FIGS. 1 and 2, with two main differences, as explained here below.

A first difference is in that the board 11 of the FIG. 3 embodiment essentially comprises five layers 14-15-16-25-26 instead of three, namely a centrally located layer 14 with 0 to 6 wt %, of cellulose based material, two outer layers 15-16, one at each side of said centrally located layer 14, and two intermediate layers 25-26, one intermediate to each of the outer layers 15-16 and the centrally located layer 14, wherein said outer layers 15-16 each have a cellulose content of 15 wt % or more and wherein said intermediate layers 25-26 have an intermediate cellulose content, preferably of 5 to 15 wt % or 6 wt % to 15%.

A second difference is in that the board 11 of the FIG. 3 embodiment comprises a decorative layer 12 including, next to a printed paper sheet 17 and an overlay, also an underlay. The underlay is, in this example, a paper sheet 27 treated with melamine formaldehyde resin, having a raw paper weight of 8 to 30 grams per square meter and a resin content of 20 to 80 grams per square meter dry weight.

It is clear that the above two differences need not necessarily be combined.

Figure 4:
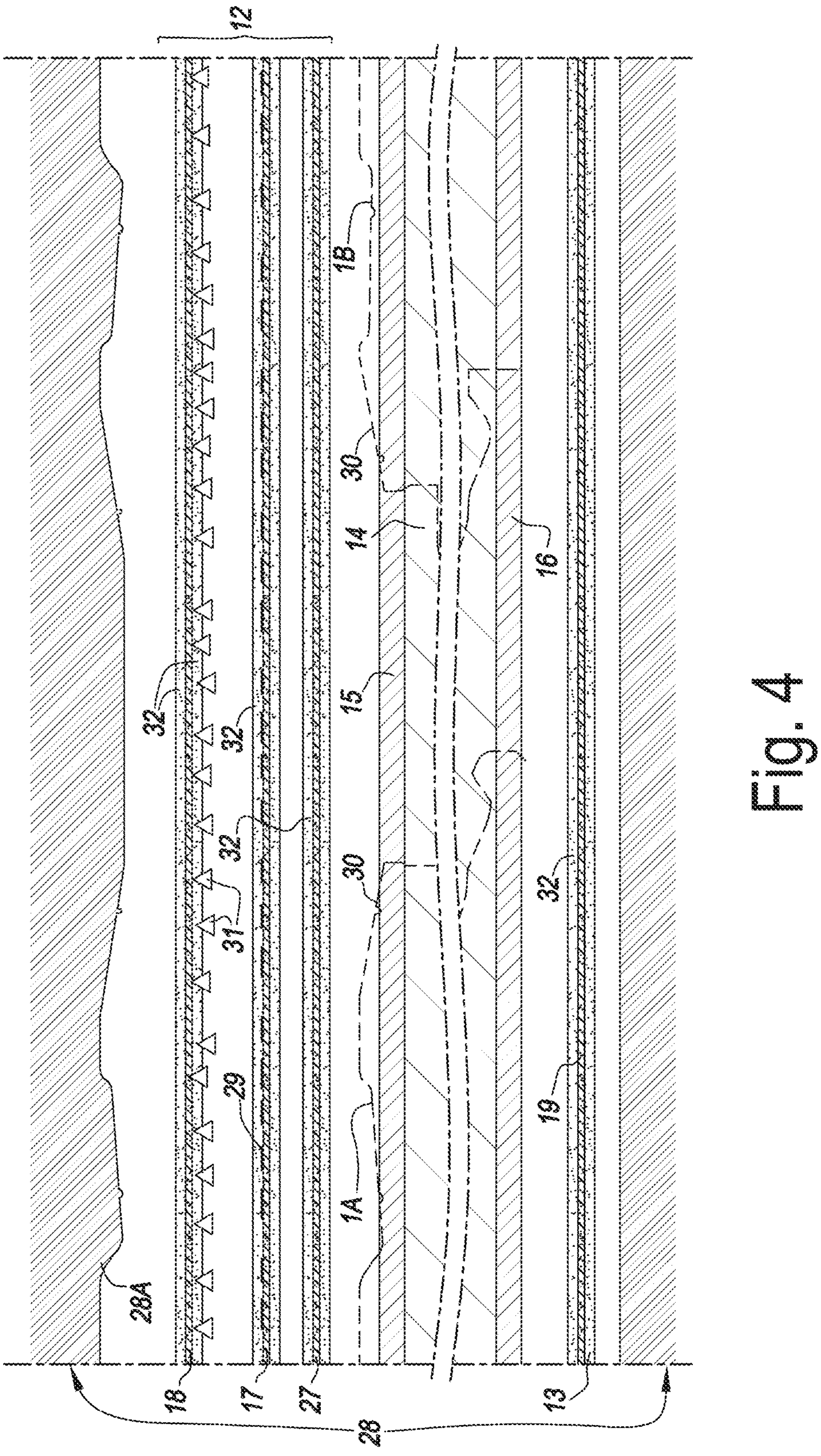
FIG. 4 schematically illustrates a method in accordance with the invention.

FIG. 4 schematically illustrates that the printed paper sheet 17, the overlay with the transparent paper sheet 18, the optional paper sheet 27 for the underlay, the board 11, and the counterbalancing layer 13 of the embodiments of FIGS. 1 to 3 may be cured and consolidated during one and the same pressing operation between heated press elements 28, for example using a DPL process. In such case, as shown here, the press element 28A contacting the overlay may be structured in order to from a relief in the surface or top side of the obtained coated panel 1A-1B. Such relief may correspond to the print 29 contained on the printed paper sheet. For example in the case of a wood print impressions imitating wood grains or grain lines may be provided in the surface. Preferably such wood grains or grain lines follow the course of the printed pattern 29.

The higher cellulose content at the upper outer layer 15 of the board 11 may accommodate deformations due to the forming of said relief. As shown here, the press element 28A is designed to form relatively deep relief or structure features, for example having a depth of 0.35 millimeter or more. The formation of deep structure features can also be eased due to the availability of said underlay.

In the present example, next to deep embossments formed in the actual upper surface of the coated panel 1, structure features forming a lower edge area at one or more of the edges of the coated panel 1 are achieved. In this case the lower edge are forms a bevel 30. FIG. 4 also illustrates by means of the contours 1A-1B of the obtained coated panels, that the upper outer layer 15 may be deformed somewhat to accommodate the deepest structure features, such as said bevels 30.

FIG. 4 further illustrates the presence of hard particles 31, such as particles of aluminum oxide at that side of the overlay which faces the printed paper sheet 17. The available resin 32 on the respective paper sheets 17-18-19-27 is also illustrated.

It is noted that, by means of the DPL pressing operation larger coated boards, or pressed wholes, are formed from which, by means of a dividing operation, such as a sawing operation, several floor panels 1A-1B may be formed. In FIG. 4 the contours of two floor panels 1A-1B adjacent in the larger coated boards are illustrated by means of the dashed lines.

It is further noted that the boards illustrated in the figures are symmetric through their thickness, i.e. the layers 15-16-25-26 at both sides of a centrally located layer 14 show a thickness, composition and order that results in a symmetric build-up as seen from the middle of the thickness of the board 11.

With regard to FIG. 3, it is further remarket that, in this example the contact surfaces 33-34 between the tongue 7 and the bottom of the upper lip 20 of the groove 8 are entirely realized the intermediate layer 25 adjacent to the upper outer layer 15.

The present invention is in no way limited to the above described embodiments, but such methods, boards and coated panels may be realized according to several variants without leaving the scope of the invention.

The invention claimed is:

1. A floor, wall or ceiling panel comprising a board and a decorative top layer; wherein the decorative top layer is provided on the board;

wherein the board is based on MgO and MgChloride or wherein the board is based on MgO and MgSulphate;

wherein the board is provided at at least two opposite edges with coupling parts allowing to couple two such panels at the respective edges, wherein a vertical locking perpendicular to a plane of coupled panels and/or a horizontal locking perpendicular to the respective edges and in the plane of the coupled panels is obtained;

wherein said board comprises at least one additive selected from a list of metal soap, silanes, siloxanes and/or siliconates or a combination of both;

wherein said coupling parts are shaped as a tongue and a groove, wherein the groove is bordered by an upper and a lower lip, wherein said upper lip is at least partially provided in a layer of the board comprising cellulose fibers;

wherein said upper lip is at least partially provided in a layer of the board comprising a higher cellulose content than at a central layer of the board.

2. The panel of claim 1, wherein at least one of said at least two opposite edges is treated with a sealant.

3. The panel of claim 2, wherein the sealant is selected from a list of an alkali resistant sealant, paraffin, latex, acrylic, polyurethane, polyvinylalchohol (PVA), ethylene vinylacetate (EVA), PVAc dispersion, acrylic styrene emulsion, silicate glue, solvent based one component resin, a solvent based two component resin, silane or siloxanes.

4. The panel of claim 1, wherein a body of the board comprises a binder selected from a list of latex, acrylic resin, polyurethane, polyvinylalchohol (PVA), ethylene vinylacetate (EVA), polyvinyl acetate (PVAc), acrylic styrene resin, silicate glue, silane or silexanes) siloxanes.

5. The panel of claim 1, wherein the board comprises separate fibers, wherein the separate fibers are selected from a list of glass fibers, PVA fibers, cellulose fibers and wood fibers.

6. The panel of claim 1, wherein the decorative top layer comprises a melamine treated paper sheet heat pressed to said board.

7. The panel of claim 1, wherein the board comprises one or more than one of:

a 517 MOS phase: $5Mg(OH)2 \cdot MgSO4 \cdot 7H2O$;

a 518 MOC phase: $5Mg(OH)2 \cdot MgCl2 \cdot 8H2O$;

a 318 MOC phase: $3Mg(OH)2 \cdot MgCl2 \cdot 8H2O$;

a 513 MOS phase: $5Mg(OH)2 \cdot MgSO4 \cdot 3H2O$; or a 318 MOS phase: $3Mg(OH)2 \cdot MgSO4 \cdot 3H2O$.

8. The panel of claim 1, wherein the board is free of glass fiber nets or unwoven structures.

9. The panel of claim 1, wherein the panel comprises a relief or structure on a top side of the panel.

10. A floor, wall or ceiling panel comprising a board and a decorative top layer; wherein the decorative top layer is provided on the board;

wherein the board is based on MgO and MgChloride or wherein the board is based on MgO and MgSulphate;

wherein the board is provided at at least two opposite edges with coupling parts allowing to couple two such panels at the respective edges, wherein a vertical locking perpendicular to a plane of coupled panels and/or a horizontal locking perpendicular to the respective edges and in the plane of the coupled panels is obtained;

wherein at least one of said at least two opposite edges is treated with a sealant;

wherein said coupling parts are shaped as a tongue and a groove, wherein the groove is bordered by an upper and a lower lip, wherein said upper lip is at least partially provided in a layer of the board comprising cellulose fibers;

wherein said upper lip is at least partially provided in a layer of the board comprising a higher cellulose content than at a central layer of the board.

11. The panel of claim 10, wherein the sealant is selected from a list of an alkali resistant sealant, paraffin, latex, acrylic, polyurethane, polyvinylalchohol (PVA), ethylene vinylacetate (EVA), PVAc dispersion, acrylic styrene emulsion, silicate glue, solvent based one component resin, a solvent based two component resin, silane or siloxanes.

12. The panel of claim 10, wherein said board comprises at least one additive selected from a list of metal soap, silanes, siloxanes and/or siliconates or a combination of both.

13. The panel of claim 10, wherein a body of the board comprises a binder selected from a list of latex, acrylic resin, polyurethane, polyvinylalchohol (PVA), ethylene vinylacetate (EVA), polyvinyl acetate (PVAc), acrylic styrene resin, silicate glue, silane or siloxanes.

14. The panel of claim 10, wherein the board comprises separate fibers, wherein the separate fibers are selected from a list of glass fibers, PVA fibers, cellulose fibers and wood fibers.

15. The panel of claim 10, wherein the decorative top layer comprises a melamine treated paper sheet heat pressed to said board.

16. The panel of claim 10, wherein the board comprises one or more than one of:

a 517 MOS phase: $5Mg(OH)2 \cdot MgSO4 \cdot 7H2O$;

a 518 MOC phase: $5Mg(OH)2 \cdot MgCl2 \cdot 8H2O$;

a 318 MOC phase: $3Mg(OH)2 \cdot MgCl2 \cdot 8H2O$;

a 513 MOS phase: $5Mg(OH)2 \cdot MgSO4 \cdot 3H2O$; or a 318 MOS phase: $3Mg(OH)2 \cdot MgSO4 \cdot 3H2O$.

17. The panel of claim 10, wherein the board is free of glass fiber nets or unwoven structures.

18. The panel of claim 10, wherein the panel comprises a relief or structure on a top side of the panel.

19. A floor, wall or ceiling panel comprising a board and a decorative top layer; wherein the decorative top layer is provided on the board;

wherein the board is based on MgO and MgChloride or wherein the board is based on MgO and MgSulphate;

wherein the board is provided at at least two opposite edges with coupling parts allowing to couple two such panels at the respective edges, wherein a vertical locking perpendicular to a plane of coupled panels and/or a horizontal locking perpendicular to the respective edges and in the plane of the coupled panels is obtained;

wherein at least one of said at least two opposite edges is treated with a sealant;

wherein said coupling parts are shaped as a tongue and a groove, wherein the groove is bordered by an upper and a lower lip, wherein said upper lip is at least partially provided in a layer of the board comprising cellulose fibers;

wherein said upper lip is at least partially provided in a layer of the board comprising a higher cellulose content than at a central layer of the board;

wherein the board comprises separate fibers, wherein the separate fibers are selected from a list of glass fibers, PVA fibers, cellulose fibers and wood fibers;

wherein the decorative top layer comprises a melamine treated paper sheet heat pressed to said board.

20. The panel of claim 19, wherein the panel comprises a relief or structure on a top side of the panel.

* * * * *